United States Patent [19]

Reichmann

[11] Patent Number: 4,631,460
[45] Date of Patent: Dec. 23, 1986

[54] DRIVING DEVICE HAVING A REVERSIBLE ELECTRIC MOTOR

[75] Inventor: Siegfried Reichmann, Rheinau-Honau, Fed. Rep. of Germany

[73] Assignee: Robert Bosch GmbH, Stuttgart, Fed. Rep. of Germany

[21] Appl. No.: 792,830

[22] Filed: Oct. 25, 1985

[30] Foreign Application Priority Data

Nov. 3, 1984 [DE] Fed. Rep. of Germany ....... 3440261

[51] Int. Cl.[4] .................. H01H 3/16; B60R 27/00
[52] U.S. Cl. ................................. 318/280; 307/10 R; 70/237; 200/61.39; 200/61.44; 310/83
[58] Field of Search ........ 318/280; 307/10 R, 10 AT, 307/10 LS; 70/237, 275, 276, 277, 278, 280; 200/1 B, 61.39, 61.44, 164, 178; 310/83

[56] References Cited

U.S. PATENT DOCUMENTS 1,486,744  3/1924  Hartzell ..................... 200/164 R
3,879,970  4/1975  Salzmann et al. ................ 70/275
4,486,818  12/1984 Hashimoto et al. ........ 307/10 LS X

FOREIGN PATENT DOCUMENTS 56-75211  6/1981  Japan ..................... 70/237

Primary Examiner—William M. Shoop, Jr.
Assistant Examiner—Bentsu Ro
Attorney, Agent, or Firm—Michael J. Striker

[57] ABSTRACT

A driving device for a reciprocating control member, preferably for a keyboard in a lock for doors of a motor vehicle, has a reversible electric motor controlled by a switching device. The electric motor controls the control member via a reduction gear. The switching device includes a stop member connected for joint rotation to the output of the reduction gear and having a convex stop surface. A contact disc is provided with two adjacent concave recesses cooperating with the stop member. A tension spring couples the contact disc to the transmission gears so as to oscillate the contact disc from one limit position in which the stop member is in engagement with one concave surface into another limit position in which the stop member is brought in engagement with the other concave stop surface.

14 Claims, 2 Drawing Figures

DRIVING DEVICE HAVING A REVERSIBLE ELECTRIC MOTOR

BACKGROUND OF THE INVENTION

The present invention relates in general to a driving device having a reversible electric motor and in particular to a device for controlling a reciprocating member of a functional part, such as used in a motor vehicle for example.

Known driving devices of this kind include switching means assembled of a plurality of limit switches and relays which are interconnected for maintaining and signalling the end positions of the control member. The disadvantage of such prior art devices is high manufacturing cost.

SUMMARY OF THE INVENTION

It is therefore a general object of this invention to provide an improved driving device of this kind which is inexpensive, robust and reliable in operation.

In keeping with these objects and others which will become apparent hereafter, one feature of the invention resides, in a combination which comprises a reversible electric motor, switching means connected between an electric power source and the electric motor to reverse direction of rotation of the latter, reduction gears having an input gear connected to the driving shaft and an output gear linked to the control member to move the same between two working positions, a stop member arranged for joint rotation with the output gear, the switching means including a contact disc supported for rotation in a plane of rotation of the stop member, the contact disc being provided with two stop surfaces cooperating with the stop member, and means for coupling the reduction gears with the contact disc to rotate the latter in one direction into a first angular position in which one of the stop surfaces engages the stop member and the control member is moved into one working position, and in opposite direction into another angular position in which the other stop surface engages the stop member and the control member is moved into an opposite working position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
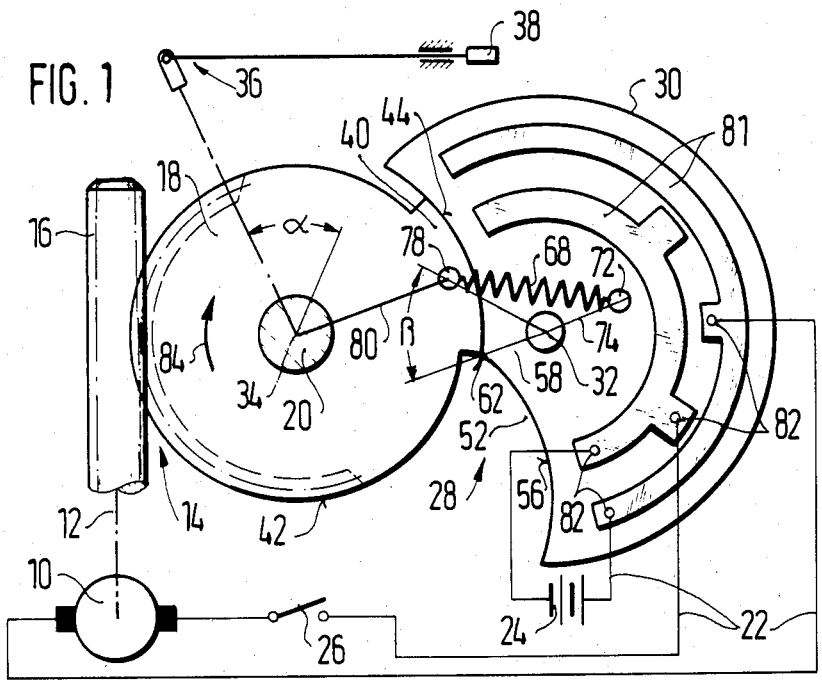
FIG. 1 is a schematic representation of the driving device of this invention shown in one limit position.

The driving device illustrated in the Figures has an electric driving motor 10 whose driving shaft 12 is connected to a worm shaft 16 of a reduction gear 14. The worm shaft 16 is in mesh with a worm gear 18 fixed on a rotary output shaft 20 of the transmission gears. The electric driving motor 10 is energized by a power supply circuit 22 including a power source 24 and a main switch 26. The power supply circuit further includes a switching device 28 by means of which the direction of rotation of the motor 10 can be changed. The switching device 28 includes a contact disc 30 supported for an oscillating movement about an axis 32. The axis 32 of the contact disc extends parallel to the axis of rotation 34 of the worm gear 18. The output shaft 20 of the reduction gear 14 is connected with transmission rods 36 linked to an adjustable control member 38. In this example, the control member is a sliding bolt in a locking device for the door of a motor vehicle. By means of the driving device of this invention, the control member 38 can be moved from one working position illustrated in FIG. 1 into another working position shown in FIG. 2. It will be seen from the Figures that to shift the control member 38 from a working position to another one, a predetermined angle of rotation of the worm gear 18 is necessary. The switching device 28 guarantees that the angular displacement of the worm gear 18 and of the output shaft 20 is precisely met in either direction of rotation of the driving motor. For this purpose, the worm gear 18 is provided with an attachment 40 projecting in radial direction beyond the periphery 42 of the worm gear. The free end of the attachment 40 is in the form of a convex stop surface 44 whose curvature is concentric with the axis of rotation 34 of the worm gear 18. The convex stop surface 44 is delimited by two radially directed flanks 46.

The contact disc 30 is formed with two recesses 50 and 52 whose adjacent concave surfaces 54 and 56 match the curvature of the convex stop surface 44. The transition of one concave surface 54 into the other concave surface 56 takes place in a point lying on a line 58 passing through the axis of rotation 32 of the contact disc 30. The contours of the concave surfaces 52 and 54 are mirror-symmetrical relative to the radial line 58. The transition point forms a tip of a projection 60 resulting at the intersection of the two concave surfaces. The transition points lie on a relatively sharp control edge 62 separating the two concave surfaces 52 and 54. Inasmuch as the convex stop surface 56 of the attachment 40 is also delimited by sharp edges 66 and 67 at the ends of radial flanks 40, a precise function of the switching device 28 is guaranteed. In order to force the contact disc 30 from one limit position to the other one, the switching device is provided with resilient coupling means including a tension spring 68. An end 70 of the tension spring is eccentrically attached at a point 72 to an end face of the contact disc 30. The attachment point 72 is situated on a line 74 passing through the axis of rotation 32 in alignment with the beforementioned radial line 58 so that the axis 32 is substantially midway between the attachment point 72 and the transition point 62. The other end 76 of the tension spring 68 is attached at an attachment point 78 to an end face of the worm gear 18. The attachment point 78 is located on a radial line 80 passing through the axis of rotation 34 of the worm gear and through a center of the convex stop surface 44. The tension spring 68 is in biased condition in either limit position of the switching device illustrated in FIGS. 1 and 2.

In the position of the switching device illustrated in FIG. 1, the tension spring 68 urges the disc 30 to rotate counterclockwise so that its concave stop surface 54 abuts against the convex stop surface 44 of the attachment 40 on the worm gear. An end face of the contact disc 30 is provided with semicircular conductive webs 81 against which resilient sliding contacts leading to terminals of power source 24 and to terminals of the electric motor, are pressed.

Figure 2:
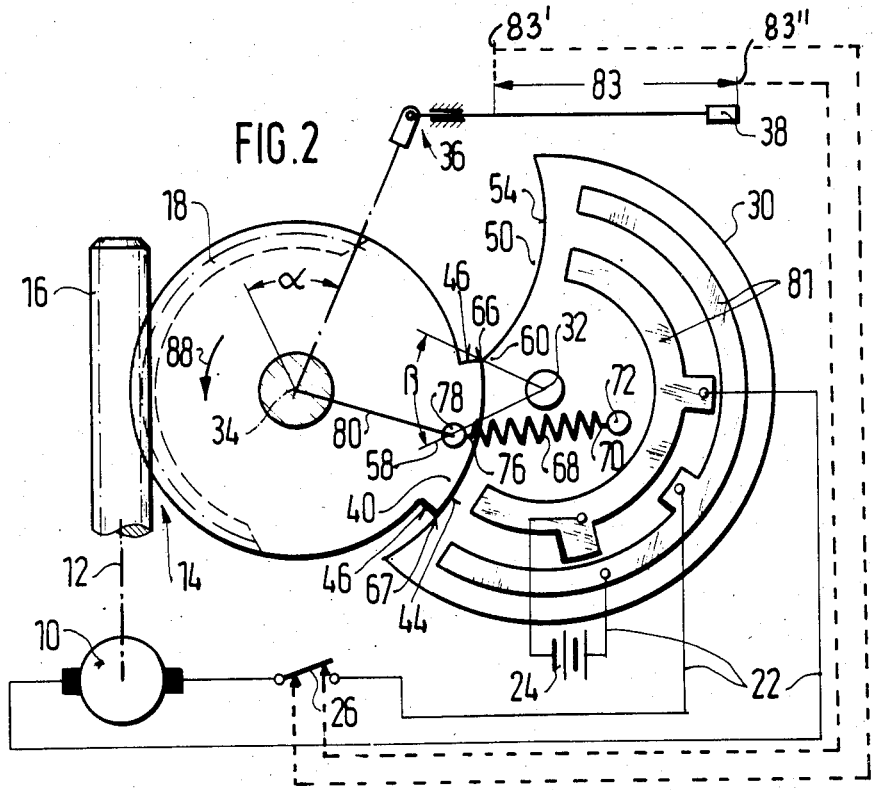
FIG. 2 is the device of FIG. 1 shown in an opposite limit position.

When it is desired to displace the control member 38 from its first or unlocking position illustrated in FIG. 1 into a second or locking position along a path of movement indicated by arrow 83 in FIG. 2, the main switch 26 is closed and the driving motor 10 is activated to rotate the worm gear 18 in the direction of arrow 84. As a consequence, the linkage 36 starts moving the control member 38 to the right on the path 83 and simultaneously the attachment 40 on the worm gear 18 is moved clockwise past the tip point 62 out of the range of the concave stop surface 54. At the same time of course, the attachment point 78 of the tension spring 68 is also rotated clockwise and moves the tensioning spring past the axis of rotation 32 of the contact disc. The oscillatory movement of the contact disc however is blocked so long until the convex stop surface 44 is in engagement with the opposite concave stop surface 54. Only at the moment when the trailing control edge 66 of the convex stop surface 44 overrides the control edge 62 of the disc 30, the spring 68 starts rotating the disc 30 clockwise and turns the same in the position of FIG. 2. The reversed rotary movement of the disc 30 introduced by the spring 68 is limited due to the engagement of the convex stop surface 44 with the other concave stop surface 66.

It will be seen from FIG. 2 due to the particular arrangement of conductive webs 81 with respect to sliding contacts 82, the polarity of power supply 24 of the driving motor 10 is reversed and the driving motor starts rotating in opposite direction indicated by arrow 88. In the shown example, however, at the moment of reversal of the rotary movement of the motor, the main switch 26 is opened by non-illustrated actuation means and the driving motor is deenergized. For example, the actuation means open the switch 26 in response to the arrival of the reciprocting control member 38 into one of its end positions on the path 83, as indicated by dashed lines 83' and 83". Accordingly, the control member 38 remains in its locking position illustrated in FIG. 2, while the conductive web and the sliding contacts of the switching device stand in a position at which upon reactivation of the main switch 26, the worm gear 18 starts rotating in the direction of arrow 88 and the control member 38 is returned into its unlocking position shown in FIG. 1. Upon reaching the unlocking position, the rotation of the driving motor 10 is reversed and stopped in the same manner as described before in connection with FIG. 2. In other words, the main switch 26 is opened and the driving motor can be energized and the switching device is again in a position at which upon closing of the main switch 26 by an operator the worm gear 18 starts rotating in the direction of arrow 84.

By virtue of the arrangement of the biased tension spring 68 it is insured that the snap over of the oscillatory contact disc 30 takes place without delay exactly at the time point when depending on the direction of rotation of the gear 18, the control edge 62 of the disc 30 overrides one of the two control edges 66 or 67 of the stop surface 44. The bias of the tensioning spring 68 is adjusted such that sliding friction in the bearings of the contact disc 30 is reliably overcome. The snapover angle through which the contact disc 30 oscillates is adjusted in dependence on the design of conductive webs 81 and sliding contacts 82 in such a manner that the polarity reversal at the driving motor 10 is guaranteed.

While the invention has been illustrated and described as embodied in a specific example of the reversible driving device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A driving device for a control member of a functional unit, comprising a reversible electric motor, switching means connected between electric power source terminals and said electric motor to reverse direction of rotation of the latter, reduction gears having an input gear connected to a driving shaft of said electric motor and an output gear linked to said control member to move the same between two working positions, a stop member arranged for joint rotation with said output gear, said switching means including a contact disc supported for rotation in a plane of rotation of said stop member, said contact disc being provided with two stop surfaces cooperating with said stop member, and means for coupling said output gear with said contact disc to rotate the latter in one direction into a first angular position in which one of said stop surfaces engages said stop member and said control member is moved into one working position, and in opposite direction into another angular position in which the other stop surface engages said stop member and said control member is moved into an opposite working position.

2. A driving device as defined in claim 1, wherein said output gear is a worm gear provided with said stop member.

3. A driving device as defined in claim 2, wherein said stop member is an attachment projecting in radial direction beyond the periphery of said worm gear, the free end of said attachment cooperating with said stop surfaces on said contact disc.

4. A driving device as defined in claim 3, wherein said free end of the attachment has the form of a circular segment concentric with the axis of rotation of the worm gear.

5. A driving device as defined in claim 4, wherein the axis of rotation of said contact disc is substantially parallel to the axis of rotation of said worm gear.

6. A driving device as defined in claim 5, wherein said two stop surfaces of said contact disc are two concave recesses adjoining each other and each matching the end surface of said stop member.

7. A driving device as defined in claim 6, wherein radii of curvature of respective concave recesses correspond to the radius of curvature of said end surface of the attachment.

8. A driving device as defined in claim 7, wherein the adjoining concave recesses are mirror-symmetrical relative to a line passing through the axis of rotation of said contact disc.

9. A driving device as defined in claim 8, wherein the adjoining portions of said concave recesses delimit a projection whose tip forms a sharp control edge.

10. A driving device as defined in claim 9, wherein said control edge extends substantially parallel to the axis of rotation of said contact disc.

11. A driving device as defined in claim 10, wherein the curved end surface of the attachment forming the stop member is delimited by two switch-over edges adjoining the lateral flanks of the attachment.

12. A driving device as defined in claim 11, wherein said coupling means includes a tension spring attached at its ends to end faces of said worm gear and of said contact disc.

13. A driving device as defined in claim 12, wherein one end of said tension spring is secured to said contact disc at an attachment point which is located on a line passing through the axis of rotation of the contact disc and through the tip of the projection separating said concave stop surfaces, the attachment point being diametrically opposed to said tip, and the other end of the tension spring being attached to said worm gear substantially at a center region of said projecting attachment.

14. A driving device as defined in claim 1, wherein at least one end face of said contact disc is provided with semi-circular conductive webs concentrically arranged about the axis of rotation of said contact disc, and said switching means further including resilient contacts pressed against said conductive webs.

* * * * *